United States Patent [19]
Lehmann et al.

[11] Patent Number: 5,372,068
[45] Date of Patent: Dec. 13, 1994

[54] ROTARY PRINTING PRESS

[75] Inventors: Rolf Lehmann, Rudolfstetten; Eugen Schnyder, Waltenschwil, both of Switzerland

[73] Assignee: Sulzer-Escher Wyss AG, Zurich, Switzerland

[21] Appl. No.: 950,393

[22] Filed: Sep. 24, 1992

[30] Foreign Application Priority Data

Sep. 25, 1991 [CH] Switzerland ............ 02 842/91-6
Nov. 6, 1991 [CH] Switzerland ............ 03 232/91-6

[51] Int. Cl.⁵ ........................ B41F 5/00; B41F 13/10
[52] U.S. Cl. ................................. 101/216; 101/375
[58] Field of Search ............. 101/375, 376, 216, 219, 101/415.1; 100/162 B, 168; 492/6, 7

[56] References Cited

U.S. PATENT DOCUMENTS

| | | | |
|---|---|---|---|
| 4,058,877 | 11/1977 | Lehmann | 492/7 |
| 4,625,637 | 12/1986 | Pav | 100/47 |
| 5,074,019 | 12/1991 | Link | 492/7 |

FOREIGN PATENT DOCUMENTS 0439822  8/1991  European Pat. Off. .

*Primary Examiner*—J. Reed Fisher
*Attorney, Agent, or Firm*—Sandler, Greenblum & Bernstein

[57] ABSTRACT

In a rotary printing press with a printing cylinder and a counter roller, such as an impression cylinder, for example, and a print web guided between them, faultless print quality across the entire width is attained, even with an extremely wide print web and a correspondingly slim printing cylinder. The printing cylinder is provided with a fixed support and a jacket, which is rotatable around it, and is supported by a row of support elements with a printing pressure which is controlled individually or in groups. With this arrangement, a uniform printing pressure profile across the print web width and, simultaneously, a print gap which is generally uniform are attained. Deformations and displacements of the printing cylinder jacket cross-wise to the printing plane are avoided in that additional cross-bracing elements for exerting a restoring force on the printing cylinder jacket cross-wise to the printing plane are provided. The restoring force of the cross-bracing elements is controlled by position sensors or bearing pressure sensors in such a way that the position of the printing cylinder jacket is maintained even with particularly lengthy and slim printing cylinders. Oscillations of the printing cylinder are prevented by hydrostatic support elements which have a damping effect.

5 Claims, 3 Drawing Sheets

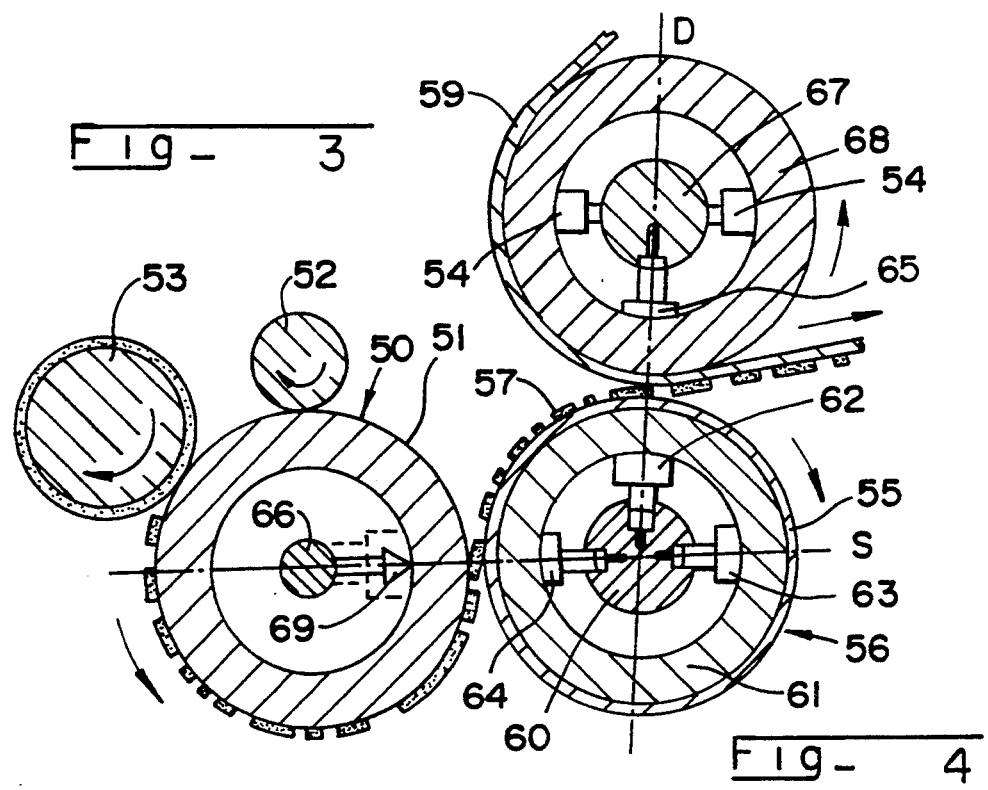
Fig_3
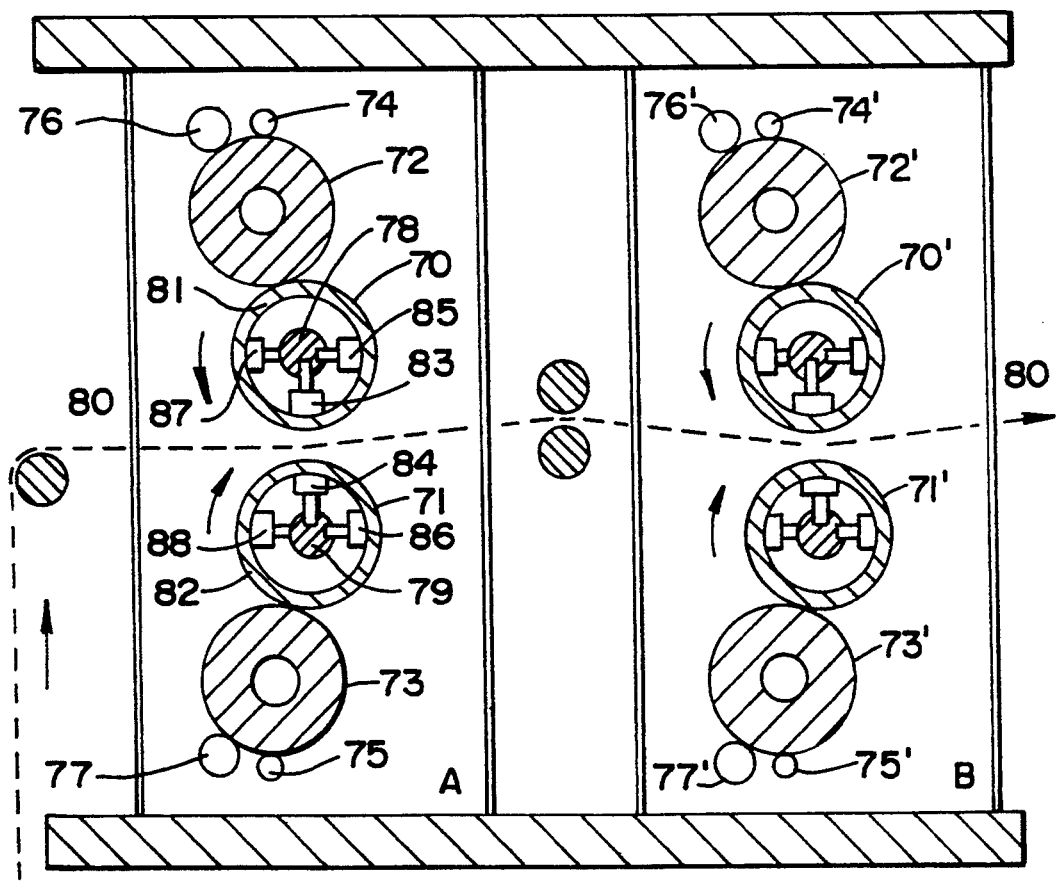
Fig_4

ROTARY PRINTING PRESS

BACKGROUND OF THE INVENTION

1. Field of the Invention

The present invention relates to a rotary printing press with a printing cylinder which is provided on its exterior surface with a printing forme support and has a counter roller capable of exerting a printing pressure on a print web guided between the counter roller and the printing cylinder.

2. Description of Background and Material Information

Printing presses of the aforementioned type include, for example, rotogravure, letterpress, flatbed or offset rotary printing presses, depending on the printing forme support. In most cases, the counter roller is embodied as an impression cylinder, i.e., a soft printing cylinder, by means of which the printing pressure needed for transferring the print pattern from the printing cylinder is exerted on the print web, such as, for example, a paper web or plastic foil or the like. However, in rotary printing presses for simultaneous printing of both sides of a print web, the counter roller can also be another printing cylinder with a different printing forme support, wherein one of the two printing cylinders exerts a printing pressure on the other printing cylinder.

A requirement for such rotary printing presses is that the print quality must be sufficiently uniform across the entire width of the print web. However, this is difficult due to the difference in bending of the printing cylinder and the counter roller, as well as the appearance of resonant oscillations in the two rollers. For meeting this requirement, nevertheless, a rotary rotogravure printing press has been suggested in European Patent Application No. 0,439,822, published on Aug. 7, 1991, and in U.S. Pat. No. 4,058,877, issued on Nov. 22, 1977, the impression cylinder of which has a fixed support and a jacket rotatable around the latter. The impression cylinder jacket is supported on the support in the printing direction by a row of support elements disposed next to each other in the axial direction and each support element has, at least partially, an individually adjustable support force.

By means of the printing pressure of the support elements, which is controllable across the width, individually or in groups, it is possible to attain a printing pressure which is uniform to a large degree, or a desired print profile across the width of the print web. In spite of this, undesirable variations in print quality across the print width have occurred in rotary printing presses of greater width and higher printing pressure, even when using such an impression cylinder and in spite of the controllability of the printing pressure across the width of the web.

SUMMARY OF THE INVENTION

Therefore, with the foregoing in mind, it is a primary object of the present invention to provide an improved rotary printing press of the aforementioned type that is not afflicted with the aforementioned limitations and disadvantages of the prior art.

Another and more specific object of the present invention is to provide a rotary printing press which permits the attainment of an improved and, in particular, a faultless print quality even under extreme loads and especially with wide print webs and printing presses or, conversely, to provide a print of faultless quality with a wider print web and a greater width of the press.

Now in order to implement these and still further objects of the present invention, which will become more readily apparent as the description proceeds, the printing cylinder has a support which is fixed against relative rotation and a jacket which is rotatable thereon, which is supported on the support, counter to the printing direction, by means of a row of support elements which are disposed next to each other in an axial direction with an at least partially individually adjustable support force.

In this case, the invention is based on the concept of not only making the printing pressure uniform across the width, but at the same time, of removing the bends in the impression cylinder and the printing cylinder caused by the printing pressure of the impression cylinder and its own weight, and of providing as uniform as possible a gap between the impression cylinder and the printing cylinder, so that in this way bulging and distortion of the print web and the reduction of the print quality caused thereby is avoided. This cannot be achieved by a special embodiment of the impression cylinder alone, but additionally requires a special embodiment of the printing cylinder.

The jacket of the printing cylinder is advantageously additionally supported on the support cross-wise or transverse to the print direction and in the direction of running of the print web by at least one cross-bracing element with an individually adjustable restoring force.

In this connection there is the further recognition that with particularly wide rotary printing presses with widths in the range above 2500 millimeters, up to the range of approximately 10000 millimeters, it is not merely sufficient to even out the printing pressure across the width of the print web, while simultaneously maintaining a level print gap. Also, because of the torque of the driven printing cylinder, a deformation and a lateral displacement of the printing cylinder out of the printing plane takes place. Because of these undesirable deformations and displacement of the printing cylinder, the auxiliary devices, such as the doctor blade for scraping excess ink off the surface of the printing cylinder or the ink application or damping rollers, cannot easily follow. This is particularly true for printing cylinders of small diameter, such as are required for certain printing jobs. By means of the appropriately controlled or regulated restoring force of the cross-bracing elements, it is possible that the jacket of the printing cylinder maintains its shape and its position in the printing plane. At the same time, bending of the printing cylinder in the printing plane because of the support elements operating in opposition to the printing pressure is eliminated.

The present invention further takes into consideration that the print quality is adversely affected by resonant oscillations in the printing press. If the support elements are embodied as hydrostatic or hydrodynamic bearings, hydraulic damping is achieved which dampens the oscillations of the spring-mass system of the printing cylinder/impression cylinder not only in the direction of the printing pressure but also perpendicularly thereto.

Although a conventional counter roller could be used, in principle, it is of particular advantage to embody the counter roller, for example the impression cylinder, also with a support fixed against relative rotation and an impression cylinder jacket rotatable thereon, as is also known in principle, which is also supported in the printing direction on the support by a row of support elements disposed axially next to each other, or in the case of dual printing presses, to provide both printing cylinders acting on each other in a similar manner with support elements which operate against each other in the respective printing direction.

A further parameter for setting a uniform printing pressure along with a level print gap is available with the present invention. When using hydrostatic or hydrodynamic bearings as support elements, optimum damping of both cylinders in the horizontal and vertical directions is achieved.

By means of the mutual action of the above-mentioned measures, it is possible, surprisingly, to obtain a uniform printing pressure across the print web width within a large printing pressure range, while at the same time maintaining a level print gap and preventing distortions of the print web. Additionally, uniform ink application across the width is ensured by the stabilization of the position and the shape of the printing cylinder jacket, even with particularly wide print webs and, because of the oscillation-damping measures, no register displacement takes place as a result of oscillations of the system.

The invention will now be described in detail by means of the exemplary embodiments illustrated in the drawings.

BRIEF DESCRIPTION OF THE DRAWINGS

The above and additional objects, characteristics, and advantages of the present invention will become apparent in the following detailed description of a preferred embodiment, with reference to the accompanying drawings which are presented as non-limiting examples, in which:

FIG. 3 is a cross-sectional view of a rotary offset press; and

FIG. 4 is a cross-sectional view of a two-color dual rotary offset press.

DETAILED DESCRIPTION OF PREFERRED EMBODIMENTS

With respect to the drawings, only enough of the construction of the invention has been depicted, to simplify the illustration, as needed for those of ordinary skill in the art to readily understand the underlying principles and concepts of the present invention.

Figure 1:
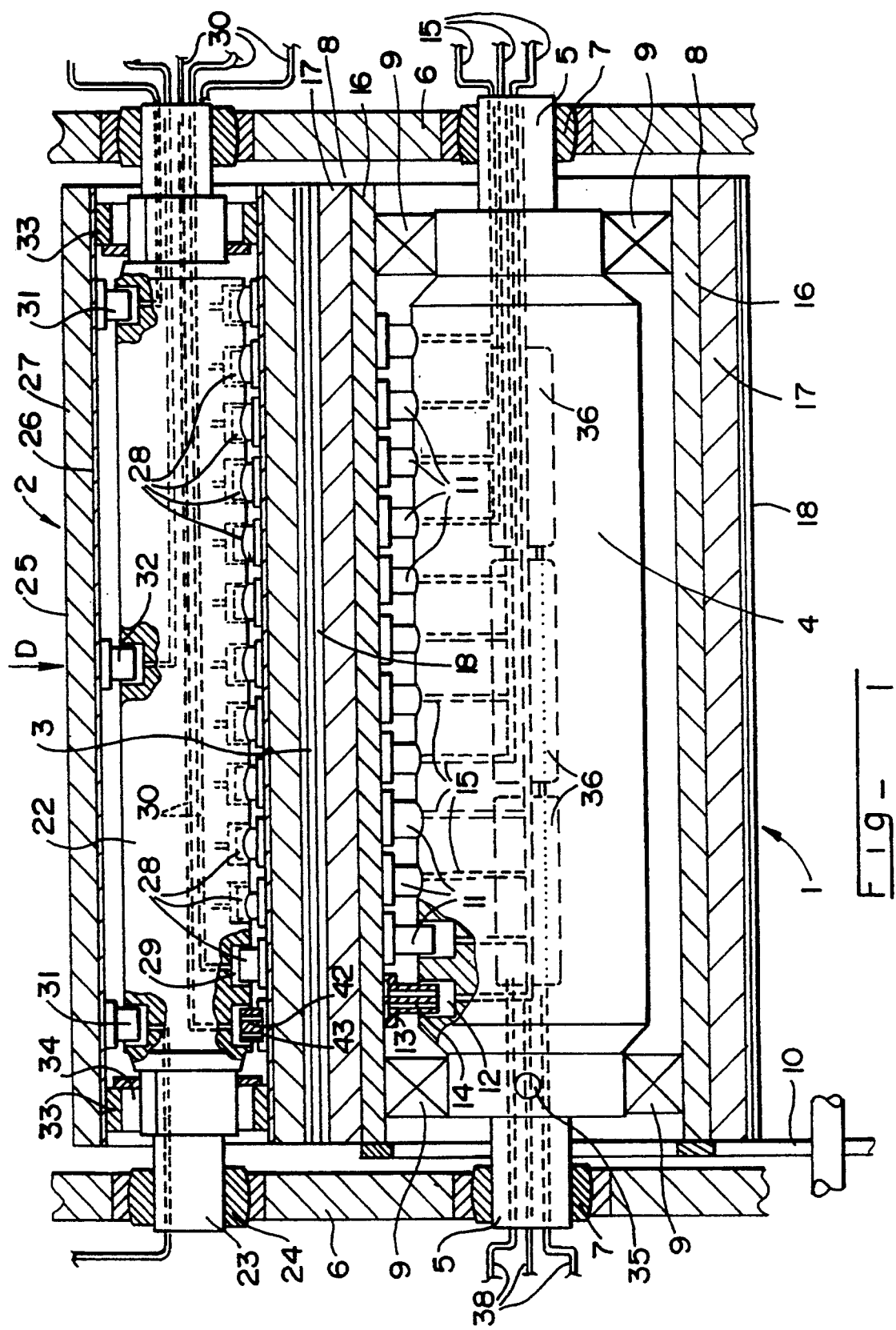
FIG. 1 is a cross-sectional view of a rotary rotogravure printing press taken along the printing plane.
Figure 2:
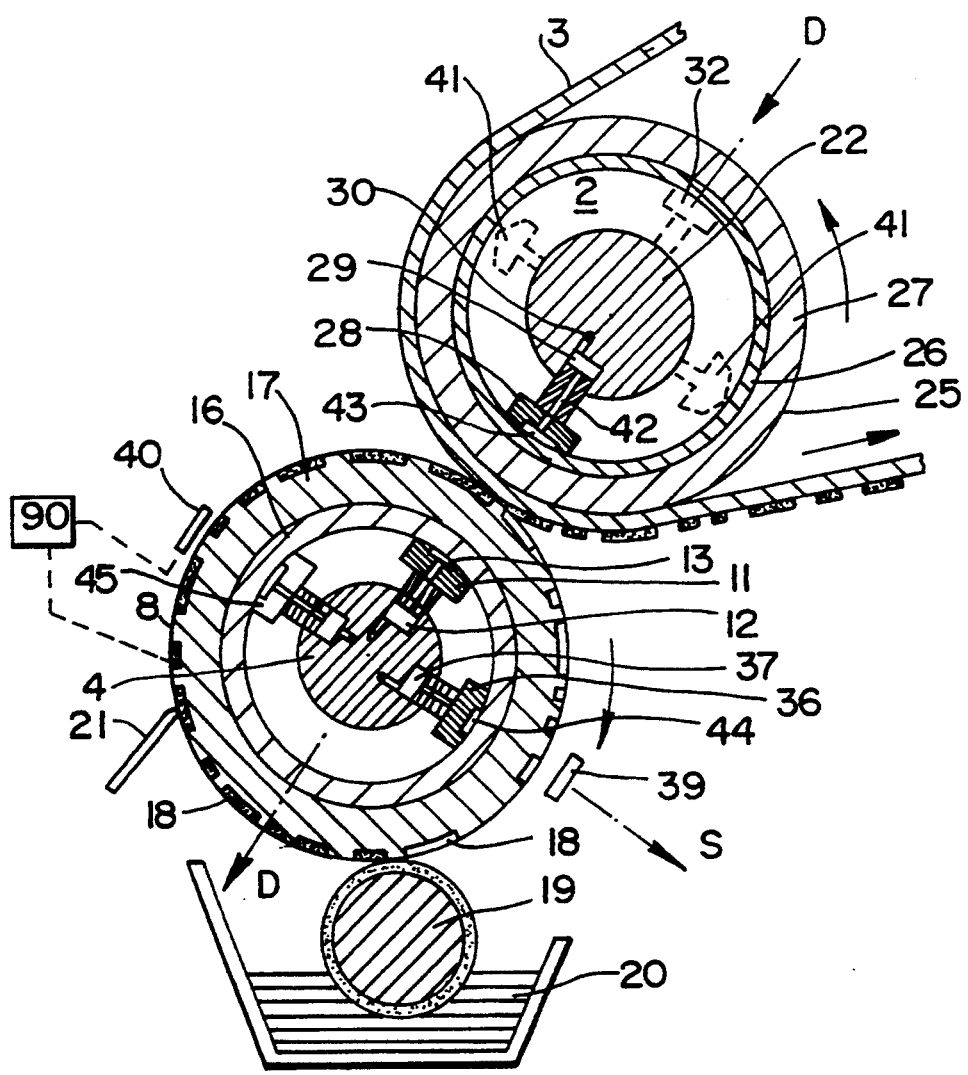
FIG. 2 is a cross-sectional view taken along a median plane of a rotary rotogravure printing press.

Turning attention now to the drawings, and specifically FIGS. 1 and 2, the printing unit of a rotary rotogravure press shown in FIGS. 1 and 2 has a printing cylinder 1 with the printing forme on its surface and an impression cylinder 2 as the counter roller. By means of the latter, a printing pressure in relation to the printing cylinder 1 is exerted on the print web 3 fed between the printing cylinder 1 and the impression cylinder 2 and consisting, for example, of paper, plastic or the like, for transferring the print pattern from the printing cylinder 1 to the print web 3.

To achieve uniform print quality across the width of the print web 3, the printing cylinder 1 is provided with a fixed support 4, the journal 5 of which is seated fixed against relative rotation in the press housing 6 by means of pivot bearings 7. The ends of a jacket 8 are seated on this support 4, rotatable by means of self-aligning bearings 9, and can be driven by a suitable drive 10 to rotate at the desired rpm or speed.

The printing cylinder jacket 8 is supported on the support 4 between the two self-aligning bearings 9 by a row of support elements 11 which are disposed next to each other in the axial direction. These support elements 11 are disposed to exert a printing pressure which is controllable individually or at least in groups in the printing plane D opposite to the pressure direction of the impression cylinder 2. With the appropriate control, it is possible to generate a uniform printing pressure across the width of the print web 3 and, at the same time, to form a print gap which is uniform to a great extent between the printing cylinder 1 and the impression cylinder 2, while preventing distortions in the print web 3.

The support elements 11 can be advantageously embodied as hydrostatic support elements, each of which is displaceable in the pressure direction D in a cylinder chamber 12 in the support 4. On their bearing face they have hydrostatic bearing pockets 13 which are connected via throttle bores 14 with the cylinder chamber 12. The cylinder chambers 12 of the separate support elements 11 can be supplied individually via pressure lines 15 or, as in the illustrated example, in several groups, with a pressure fluid having an adjustable pressure. By means of this it is achieved that the printing pressure of the separate support elements 11 can be controlled and regulated individually or in groups. Because of the ability of the support elements to follow, this can be done independently of the bending of the support 4 under the influence of the printing pressure and the attendant forces. This means that in spite of bending of the support 4 under the printing pressure, the print gap between the printing cylinder 2 and impression cylinder 3 remains uniform, as does the print web 3 in the print gap.

It should be noted that, in place of the described support elements, other types of support elements with individually controllable support force could be used, such as hydrodynamic, pneumatic, magnetic or other support elements. Advantageously, those are selected which also have oscillation-damping properties in addition to providing the printing pressure.

The jacket 8 of the printing cylinder 1 is advantageously constructed of a plurality of coaxial parts, for example an interior tube 16, made of wound fiberglass-reinforced plastic or a polymer material, for example, and an exchangeable filler body 17 adjoining on the outside, for example made of a resilient material, which is provided with the printing forme support 18 on its exterior. This can be a replaceable printing forme or a printing forme applied by electroplating and later engraved or etched. As particularly shown in Fig. 2, printing ink from a reservoir 20 is applied to the printing forme support 18 by means of an ink application roller 19. Excess ink is scraped off the printing forme support 18 by means of a doctor blade 21, so that ink is transferred to the print web 3 only at the desired places.

The impression cylinder 2, which cooperates in the form of a counter roller with the printing cylinder 1, can be embodied in the conventional manner as a roller with a soft, elastic cover. A force for generating the required printing pressure is exerted on the journals of the impression cylinder. By means of this it is possible to generate a printing pressure which is uniform across the print web width, or a desired printing pressure profile, in a defined area and in cooperation with a printing cylinder 1 having a printing pressure which can be individually controlled across the width. The bending caused by the printing pressure and the weight of the impression cylinder should be compensated by suitable measures, for example bowing of the impression cylinder, so that it is additionally possible to achieve a print gap which is uniform to a great extent at a predetermined printing pressure.

In order to attain simultaneously a uniform printing pressure across the width as well as a uniform print gap and additionally damping also within a larger printing pressure range, it is also advantageous to provide the impression cylinder with a support 22, the journal 23 of which is seated pivotally, but fixed against relative rotation, in the press housing 6 by means of self-aligning bearings 24, and with an impression cylinder jacket 25 comprising a resilient interior tube 26 and a soft rubber or elastomeric cover 27. The impression cylinder jacket 25 is also supported on the support 22 with a row of support elements 28 axially disposed next to each other. Here, too, the support elements can be embodied as following hydrostatic support elements, which are movable in the printing direction D in a pressure chamber 29 in the support 22. On their bearing surfaces they have hydrostatic support pockets 43, which are connected via throttle conduits or bores 42 with the associated pressure chamber 29. The separate pressure chambers 29 of the support elements 28 can be supplied individually or in groups with a pressure fluid having an adjustable pressure via lines 30.

The controllable printing pressure of the support elements 28 of the impression cylinder 2 represents a further parameter, by means of which it is possible, even with different printing pressures, i.e., over a larger printing pressure range, to achieve simultaneously a uniform printing pressure across the print web width as well as a print gap which is uniform to a great extent.

Additional support elements 31 acting in the opposite direction are provided on the edges of the impression cylinder jacket 25 for correcting edge effects, for example overprinting at the edges of the print web, or for changes to a different width of the print web. A further support element 32 acting in the opposite direction is additionally disposed in the center of the jacket, by means of which and together with the edge support elements 31, the impression cylinder can be raised in a simple manner.

The impression cylinder jacket 25 is advantageously seated at the edges on a guide device 34 by means of selfaligning bearings 33 which permits, on the one hand, the rotation of the impression cylinder jacket 25 around the support 22 and, on the other, a predetermined movement in the printing direction D by means of a suitable connecting link, parallelogram or sliding guide, for example. However, instead of this it is also possible that the impression cylinder jacket 25 can be seated on the support 22 so that it cannot be displaced in the printing direction. In this case the printing cylinder jacket 8 is then seated, displaceable in the printing direction, on the respective support 4. Also, both jackets 8 and 25 can be fixedly seated on the respective supports 4 and 22, but in that case it is additionally necessary to provide adjustment forces to the impression cylinder journal 23.

It has been found that with print web widths in the range of 2500 millimeters and with the customary printing cylinder diameters of 250 to 350 millimeters, the above-mentioned measures are in general sufficient for obtaining the required print quality across the entire print web width. With modern presses with wider printing cylinders up into the range of approximately 10000 millimeters and correspondingly more slim printing cylinders with a diameter/length ratio up into the range of 1:40 and a paper web speed up to 20 meters/second, the above described measures have been found to be insufficient, even in combination, to ensure a qualitatively faultless print across the entire print web width.

It was recognized that the reason for the lessening of the quality in particularly wide rotary printing presses was that even the relatively flexible printing cylinders are also deformed because of the forces and torques during the operation of the printing press, in particular that the jacket 8 of the printing cylinder 1 tends to yield in a lateral direction S, as shown in FIG. 2. This takes place to a greater degree in the center of the cylinder and to a lesser degree towards the ends of the jacket 8. This deformation results in undesirable distortions of the print image.

Furthermore, in wide rotary presses without special precautions, the contact line with the ink application roller was changed, so that inking of the printing forme, on the one hand, and the uneven wear of the ink application roller, on the other, negatively affected the print result. The contact line with the doctor blade was also changed and the doctor blade pressure across the width was changed in such a way that the removal of excess ink from the surface became uneven across the web width and the ink application became uneven over the width of the print web 3 and smearing occurred in certain areas and partial wear of the doctor blade and the printing forme resulted.

To eliminate these effects, according to the present invention, the jacket 8 of the printing cylinder 2 is additionally supported in the lateral direction S on the support 4 by further cross-bracing elements 36. These crossbracing elements 36 can again be following hydrostatic support elements, the pressure chambers 37 of which, being connected with bearing pockets 44, can be supplied via pressure lines 38 with a pressure fluid having an adjustable pressure, which results in the additional advantage of damping, or can be different support elements with controllable support power. It is advantageous if the support power of these cross-bracing elements 36 is directed approximately perpendicularly to the printing direction or has at least a considerable component perpendicular to the printing direction D. In this case the cross-bracing elements 36 can also be embodied as elongated support bars, the number of which can also be less than the number of support elements 11 acting in the printing direction. In the extreme case a single cross-bracing element 36 may be sufficient. However, advantageously at least three cross-bracing elements 36 or at least three groups of such support elements are chosen. Counter-bracing elements 45 acting in the opposite direction can be additionally provided for improved oscillation damping.

To maintain the exact position and shape of the printing cylinder jacket 8, a position sensor 39 and/or 40, supported on the press housing 3, is provided on at least one side of the printing cylinder 2 in the lateral direction S. Contactless position sensors 39, 40 are advantageously used for measuring the position of the exterior surface of the printing cylinder jacket 8. Such sensors include, for example, inductive distance measuring devices or those operating by means of laser beams or the like. The pressure of the pressure fluid in the pressure line 38 and thus the restoring force of the cross-bracing element is readjusted by the output signal of the distance measuring device 39, 40 via a suitable control device 90 until the position of the printing cylinder surface 18 reaches the planned set point at which faultless ink application by the ink application roller 19 and clean removal of excess ink by the doctor blade 21 is assured. With very slim and flexible printing cylinders, it is possible only by means of this to obtain qualitatively faultless printing across the entire width of the print web 3.

Instead of the position sensors 39 and 40, it is also possible to provide sensors 35 cross-wise or transverse to the printing plane D for measuring the lateral bearing force at the bearings 9, by means of which the jacket 8 is rotatably seated on the support 4, or the bearings 7, in which the entire printing cylinder is seated, which regulate the restoring force of the cross-bracing elements 36 in such a way that the bearing force tends towards zero. This means that the jacket 8 is balanced and is not laterally deflected.

With impression cylinders which are provided with a flexible jacket 25, it is advantageous to provide additional guide elements 41 in the lateral direction, too, for the prevention of lateral movement. As a rule these can also be simple guide elements connected with the support 22, because usually the same precision as with the printing cylinder 1 is not required from the impression cylinder 2.

The concept of the invention described above by means of a rotary rotogravure printing press can also be used with other rotary printing presses with different printing forme supports, such as letterpress, flatbed or offset rotary printing presses.

In the rotary offset printing press shown in FIG. 3, the printing cylinder 50 has on its surface 51 the primary printing forme on which, following the damping roller 52, the ink is applied by means of the ink application roller 53 and adheres to the planned places of the surface 51. Then the ink is transferred from the surface 51 of the prickling cylinder 50 to the rubber or elastomeric surface 55 of the following printing cylinder 56, on which it forms a secondary printing forme 57. This is transferred in turn to the paper web 59 being fed through the gap between the printing cylinder 56 and the impression cylinder 58.

Here, too, the printing cylinder 56 includes a support 60, fixed against relative rotation, and a jacket 61 which is rotatable around it and which is provided on its surface with the rubber or elastomeric layer 55 required for transferring the printing forme. On the one hand, the jacket 61 is equipped with a row of following support elements 62, which are disposed axially next to each other and act in the printing direction D and generate, together with the impression cylinder 58, the uniform printing pressure required across the width. On the other hand it is also equipped with cross-bracing elements 63 and 64, acting laterally to the printing direction D.

The support elements 62, 63 and 64 may again be embodied as hydrostatic support elements movable in a cylindrical pressure chamber or in another suitable form.

The impression cylinder 58 can also be provided with a row of following support elements 65 acting in the printing direction D, and with cross-bracing elements 54. In this case the printing cylinder 50 can be embodied in the conventional manner where, if required, additional force can be applied via the journals 66, or where a counter-force can be generated via analogous pressure elements 69 acting against the printing cylinder 56, or where the printing cylinder journal 66 is fixedly seated and the pressure force is generated by the elements 64.

By means of regulation of the support forces of the support elements 62, 63 and 64 in cooperation with suitable position sensors it is possible here, too, to maintain the position of the printing cylinder 56 and the printing profile of the print gap in such a way, that it is possible to achieve a qualitatively faultless print across the entire print web width, even with particularly wide print webs and correspondingly slim cylinders.

The concept of the invention can also be used in an analogous fashion with more complicated printing presses, such as the two-color dual rotary offset press shown in FIG. 4. It includes two successively placed printing units A and B for two different colors, each with two printing cylinders 70, 71 and 70', 71' for the simultaneous printing of both sides of the paper web 80 running between the printing cylinders. The printing forme is transferred to the surfaces of the printing cylinders 70, 71 from the respectively associated pressure cylinders 72, 73, which in turn are inked by means of respective damping rollers 74, 75 and ink application rollers 76, 77.

Again the two printing cylinders 70 and 71 include a respective support 78, 79, which is fixed against relative rotation, and a respective jacket 81, 82, which is rotatable around a respective support 78, 79, which is supported on the support 78, 79 with at least one support element 83, 84 with an individually controllable printing pressure. In this case the printing cylinder jacket 81 of the two jackets is seated, displaceable in the printing direction over its entire length, while the second printing cylinder jacket 82 is seated on the support rotatably, but non-displaceable. In this way, the one printing cylinder 70 executes the function of the impression cylinder in the first described exemplary embodiment.

In order to be able here, too, to prevent deformation and lateral yielding of the press cylinders 70, 71, additional support elements 85, 86, acting in the lateral direction, are provided. They act with such a restoring force on the jacket 81, 82, that its position is maintained and a faultless print quality can be achieved even with relatively wide print webs 80. Here, too, control of the restoring forces can take place by means of suitable position sensors. Here, too, is it possible for attaining improved stabilization and oscillation damping to provide additionally counter-bracing elements 87, 88.

The succeeding printing unit B and possibly further following printing units for additional colors are advantageously constructed analogously to the first printing unit A. Elements of the printing unit B corresponding to the printing unit A are indicated in FIG. 4 by an apostrophe (').

This application is based upon Swiss Application No. 02 842/91-6, filed on Sep. 25, 1991 and Swiss Application No. 03 232/91-6, filed on Nov. 6, 1991, the priorities of which are claimed and the disclosures of which are hereby expressly incorporated by reference thereto in their entireties.

Finally, although the invention has been described with reference of particular means, materials and embodiments, it is to be understood that the invention is not limited to the particulars disclosed and extends to all equivalents within the scope of the claims.

What is claimed is:

1. A rotary printing press with comprising:
   a printing cylinder having an exterior surface comprising a printing forme support; and
   a counter roller arranged to exert a printing pressure on a print web guided between said counter roller and said printing cylinder;
   said printing cylinder further comprising:
   a support fixed against relative rotation;
   a jacket mounted for rotation with respect to said support; and
   a row of main support elements disposed axially next to each other for providing at least partially individually adjustable support forces for supporting said jacket in a printing direction;
   wherein said print web is positioned to travel in a running direction and wherein said rotary printing press further comprises:
   at least one cross-bracing support element for providing additional support for said jacket in said running direction, said at least one cross-bracing support element being arranged substantially cross-wise to said main support elements and comprising means for providing an individually adjustable restoring force for said jacket; and
   at least one counter-bracing support element for providing additional support for said jacket in a direction opposite to said support provided for said at least one cross-bracing element.

2. A rotary printing press in accordance with claim 1, further comprising:
   at least one position sensor for measuring the position of the printing cylinder jacket transverse to said printing direction and for controlling said restoring force of said at least one cross-bracing support element for maintaining said printing cylinder in a predetermined position.

3. A rotary printing press in accordance with claim 1, further comprising:
   bearings for rotatably seating said jacket on said support against radial movement; and
   force sensors for measuring bearing force of said bearings and for controlling said restoring force of said cross-bracing support elements so that said bearing force at least approximately approaches zero.

4. A rotary printing press in accordance with claim 1, wherein:
   at least a portion of elements selected from a group consisting of main support elements, cross-bracing support elements and counter-bracing elements are embodied as hydraulic support elements, wherein said hydraulic support elements are movably mounted in respective pressure chambers, said pressure chambers being supplied with a pressure fluid under a controlled adjustable pressure.

5. A rotary printing press in accordance with claim 4, wherein:
   at least one of said hydraulic support elements is provided with a respective bearing surface, each bearing surface communicating with a respective pressure chamber via a throttle conduit through a respective hydraulic support element.

* * * * *